United States Patent
Lee et al.

(10) Patent No.: US 10,226,911 B2
(45) Date of Patent: Mar. 12, 2019

(54) MULTI-LAYER DECORATING ELEMENT

(71) Applicant: JAH YIH ENTERPRISE CO., LTD., Taichung (TW)

(72) Inventors: Chi-Shih Lee, Taichung (TW); Chun-Hsien Lee, Taichung (TW); Meng-Chun Wang, Taichung (TW)

(73) Assignee: Jah Yih Enterprise Co., Ltd., Taichung (TW)

( * ) Notice: Subject to any disclaimer, the term of this patent is extended or adjusted under 35 U.S.C. 154(b) by 0 days.

(21) Appl. No.: 15/675,902

(22) Filed: Aug. 14, 2017

(65) Prior Publication Data

US 2018/0009192 A1 Jan. 11, 2018

Related U.S. Application Data

(60) Continuation-in-part of application No. 13/895,488, filed on May 16, 2013, now abandoned, which is a
(Continued)

(30) Foreign Application Priority Data

Jan. 20, 2011 (TW) .............................. 100102158 A
Feb. 1, 2011 (TW) .............................. 100103917 A

(51) Int. Cl.
*B32B 3/02* (2006.01)
*B32B 3/14* (2006.01)
(Continued)

(52) U.S. Cl.
CPC .............. *B32B 7/12* (2013.01); *A43B 1/0027* (2013.01); *A43B 3/0078* (2013.01);
(Continued)

(58) Field of Classification Search
CPC . A43B 1/0027; A43B 3/0078; A43B 23/0235; A43B 23/0255; A43B 23/024;
(Continued)

(56) References Cited

U.S. PATENT DOCUMENTS 3,568,339 A   3/1971  Hara et al.
D223,329 S *  4/1972  Oshima .......................... D2/907
(Continued)

FOREIGN PATENT DOCUMENTS

CN      1625992        6/2005
CN      2734523 Y     10/2005
(Continued)

*Primary Examiner* — Joanna Pleszczynska
(74) *Attorney, Agent, or Firm* — Alan D. Kamrath; Kamrath IP Lawfirm, P.A.

(57) ABSTRACT

A multi-layer decorating element includes a base and a plurality of plates forming decorative elements. The base has a length between the first and second ends thereof and an increased width from the first end to the second end. The first end of the base is curved. The second end of the base is divided by a gap into two segments. The gap has a closed end and an open end. The open end is disposed at the second end of the base. The closed end has a smaller width than the open end. The plurality of plates includes a side with a hot melt glue layer and is hot pressed on a side of the base. The plurality of plates is disposed within peripheral edges of the base and includes a plurality of overlapped sections. The plurality of plates has different shapes.

7 Claims, 2 Drawing Sheets

Related U.S. Application Data division of application No. 13/053,494, filed on Mar. 22, 2011, now Pat. No. 8,496,777.

(51) Int. Cl.

| | | |
|---|---|---|
| *B32B 5/26* | (2006.01) | |
| *B32B 7/12* | (2006.01) | |
| *B32B 27/06* | (2006.01) | |
| *B32B 27/12* | (2006.01) | |
| *B32B 27/40* | (2006.01) | |
| *A43B 3/00* | (2006.01) | |
| *B32B 3/26* | (2006.01) | |
| *B29D 35/14* | (2010.01) | |
| *A43B 23/07* | (2006.01) | |
| *A43B 23/02* | (2006.01) | |
| *A43B 1/00* | (2006.01) | |
| *A43B 23/24* | (2006.01) | |
| *B32B 5/02* | (2006.01) | |
| *B32B 9/02* | (2006.01) | |
| *B32B 9/04* | (2006.01) | |

(52) U.S. Cl.
CPC ...... *A43B 23/0235* (2013.01); *A43B 23/0255* (2013.01); *A43B 23/07* (2013.01); *A43B 23/24* (2013.01); *B29D 35/146* (2013.01); *B32B 3/02* (2013.01); *B32B 3/14* (2013.01); *B32B 3/263* (2013.01); *B32B 5/02* (2013.01); *B32B 5/26* (2013.01); *B32B 9/025* (2013.01); *B32B 9/045* (2013.01); *B32B 9/047* (2013.01); *B32B 27/06* (2013.01); *B32B 27/12* (2013.01); *B32B 27/40* (2013.01); *B32B 2250/02* (2013.01); *B32B 2307/404* (2013.01); *B32B 2437/02* (2013.01); *B32B 2451/00* (2013.01); *Y10T 156/1074* (2015.01); *Y10T 156/1089* (2015.01); *Y10T 428/24612* (2015.01); *Y10T 428/24752* (2015.01); *Y10T 428/249921* (2015.04); *Y10T 428/31504* (2015.04); *Y10T 428/31551* (2015.04)

(58) Field of Classification Search
CPC .. B32B 7/12; B32B 3/263; B32B 3/02; B32B 3/14; B32B 5/26; B32B 27/06; B32B 27/12; B32B 27/40; Y10T 428/24612; Y10T 428/24752; Y10T 428/249921; Y10T 428/31504; Y10T 428/31551
USPC .................................. D2/907, 974
See application file for complete search history.

(56) References Cited

U.S. PATENT DOCUMENTS

| | | |
|---|---|---|
| 3,713,938 A | 1/1973 | Sutton |
| 4,347,673 A | 9/1982 | Svetlik |
| 4,899,411 A | 2/1990 | Johnson et al. |
| 5,932,056 A | 8/1999 | Mark et al. |
| 6,025,064 A | 2/2000 | Kawata et al. |
| 6,558,784 B1 | 5/2003 | Norton et al. |
| 6,670,029 B2 | 12/2003 | Norton et al. |
| 6,765,123 B2 | 7/2004 | de Jong et al. |
| 6,769,204 B1 | 8/2004 | Phillips |
| 6,802,140 B2 | 10/2004 | Aslanides |
| D568,586 S * | 5/2008 | Dolce ............................ D2/902 |
| 7,611,767 B2 | 11/2009 | Usui et al. |
| 7,625,625 B2 | 12/2009 | Rios et al. |
| 7,827,704 B2 | 11/2010 | Fox et al. |
| 7,832,123 B2 | 11/2010 | Fallon et al. |
| 8,012,293 B2 | 9/2011 | Lee |
| 8,091,963 B2 | 1/2012 | Wyner et al. |
| 2002/0078599 A1 | 6/2002 | Delgorgue et al. |
| 2003/0176130 A1 | 9/2003 | Lee |
| 2004/0042965 A1 | 3/2004 | Usui et al. |
| 2004/0087230 A1 | 5/2004 | Wildeman |
| 2004/0149732 A1 | 8/2004 | Usui et al. |
| 2004/0172855 A1 | 9/2004 | Aslanides |
| 2005/0161144 A1 | 7/2005 | Nakajima et al. |
| 2006/0112594 A1 | 6/2006 | Kilgore |
| 2007/0137068 A1 | 6/2007 | Fallon et al. |
| 2007/0141282 A1* | 6/2007 | Chang .................... A43B 13/20 |
| | | 428/35.2 |
| 2007/0148409 A1 | 6/2007 | Rios et al. |
| 2007/0204485 A1 | 9/2007 | Kilgore |
| 2008/0250668 A1 | 10/2008 | Marvin et al. |
| 2009/0119948 A1 | 5/2009 | Ortley et al. |
| 2009/0162596 A1 | 6/2009 | Rios et al. |
| 2009/0178355 A1 | 7/2009 | Pugh et al. |
| 2010/0018082 A1 | 1/2010 | Stokes |
| 2010/0080966 A1 | 4/2010 | Lee |
| 2010/0272970 A1 | 10/2010 | Chang |
| 2012/0186102 A1 | 7/2012 | Lee et al. |
| 2012/0267043 A1 | 10/2012 | Lee |
| 2012/0297642 A1 | 11/2012 | Schaefer et al. |
| 2012/0297643 A1 | 11/2012 | Shaffer et al. |

FOREIGN PATENT DOCUMENTS

| | | |
|---|---|---|
| CN | 2801468 | 8/2006 |
| JP | 2011224791 A | 11/2011 |
| TW | M336173 | 7/2008 |

* cited by examiner

MULTI-LAYER DECORATING ELEMENT

CROSS REFERENCE

The present application is a continuation-in-part of U.S. patent application Ser. No. 13/895,488 filed on May 16, 2013, now abandoned, which is a division of U.S. application Ser. No. 13/053,494 filed on Mar. 22, 2011, now U.S. Pat. No. 8,496,777.

BACKGROUND OF THE INVENTION

1. Field of the Invention

The present invention relates generally to a multi-layer decorating element and, more particularly, to a multi-layer decorating element for an upper for a shoe.

2. Description of the Related Art

Shoes have been specialized and improved for years. Currently, shoe manufacturers and designers provide specialized shoes for many activities, such as, for example, running shoes, tennis shoes, cycling shoes, walking shoes, cross-trainers, and the like. These shoes can be designed to respond to particular pressures and hot spots for the assumed usage.

U.S. Pat. No. 7,832,123 shows a set of shoes for use by members of a team. The shoes allow for a uniform appearance in a team environment by way of substantially similar uppers, while providing individualized performance specifications, with respect to support and breathability, for each upper. The substantially similar appearance of the upper may be due to material overlays, stitch patterns, color schemes and/or perforations and may be based on team criteria. The uppers are materially different from each other due to internal or external supports, material types and/or breathabilities.

Presently, the construction of a shoe upper requires a substantial amount of manual labor. While the production of a sole of a modern sport shoe can be automated to a great extent, the stitching of the different materials of the upper still requires a significant amount of manual labor.

The present invention is, therefore, intended to obviate or at least alleviate the problems encountered in the prior art.

SUMMARY OF THE INVENTION

According to the present invention, a multi-layer decorating element includes a base and a plurality of plates forming decorative elements. The base has a length between the first and second ends thereof and first and second widths at the first and second ends respectively. The second width is greater than the first width. The first end of the base is curved and defines a curved peripheral edge. The second end of the base is divided by a gap into two segments. The two segments are disposed on opposite sides of an axis A with one segment being a mirror image of another segment. The gap extends in the length direction and has a length less than the length of the base. The gap has a closed end and an open end opposite the closed end. The open end is disposed at the second end of the base. The closed end is disposed between the first and second ends of the base. The closed end has a smaller width than the open end.

The plurality of plates includes a side with a hot melt glue layer and which is hot pressed on a side of the base. The plurality of plates is disposed within peripheral edges of the base and includes a plurality of overlapped sections. The plurality of plates has different shapes.

Other advantages and features of the present invention will become apparent from the following description referring to the drawings.

BRIEF DESCRIPTION OF THE DRAWINGS

The present invention will be described through detailed illustration of the preferred embodiments referring to the drawings.

DETAILED DESCRIPTION OF THE INVENTION

Figure 1:
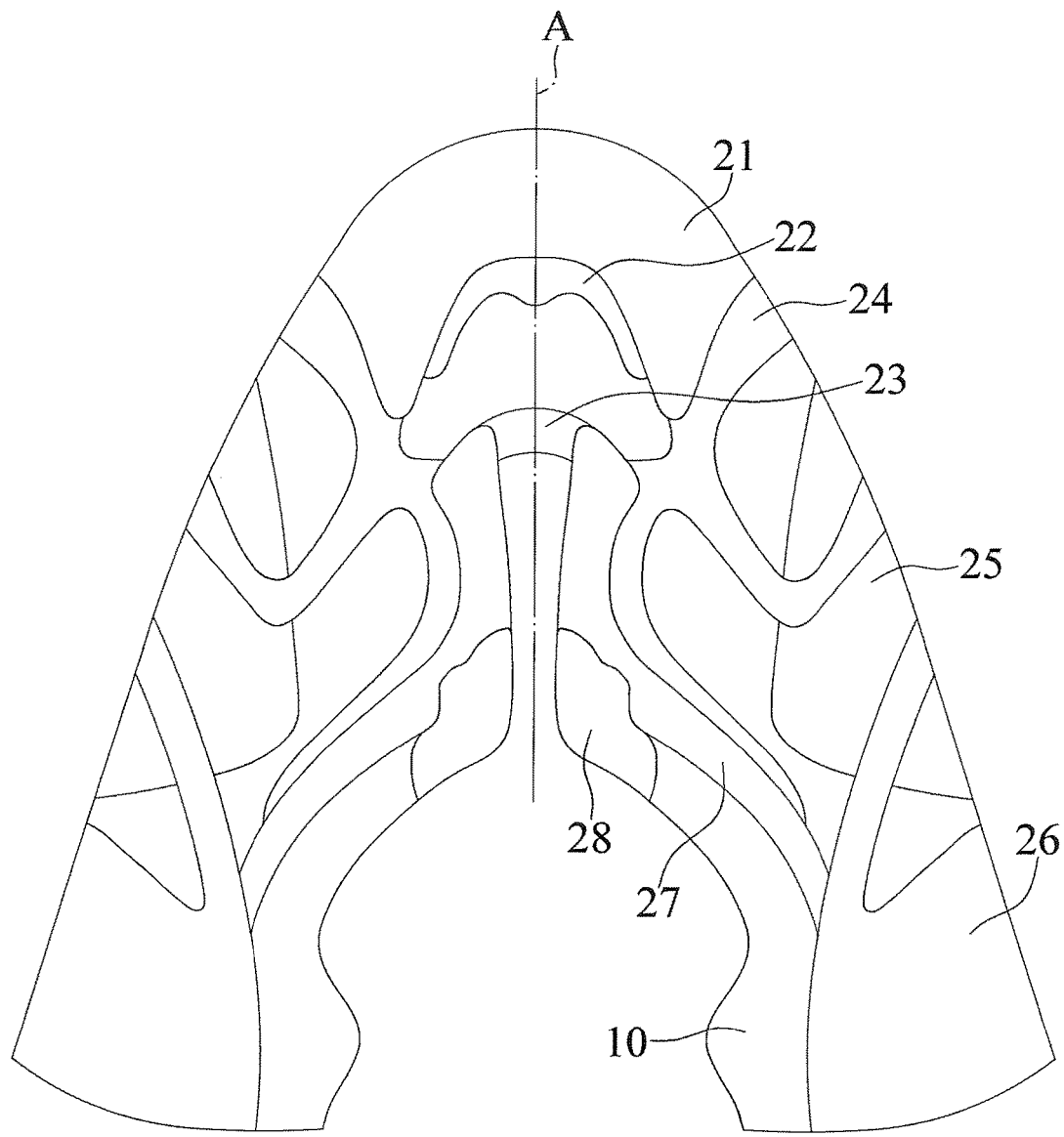
FIG. 1 is a top plan view of a multi-layer decorating element according to the present invention.

The present invention will be described through detailed illustration of three embodiments referring to the drawings.

Figure 2:
FIG. 2 is a top plan view showing the multi-layer decorating element of the present invention with different shaped and colored layers.

Referring to FIGS. 1 and 2, there is shown a multi-layer decorating element according to the present invention. The multi-layer decorating element is adapted for making an upper of the shoe or an outer surface of a bag. The multi-layer decorating element comprises a base 10 and at least one first, second, third, fourth, fifth, sixth, seventh and eighth plates 21, 22, 23, 24, 25, 26, 27 and 28.

The base 10 has a first end and a second end longitudinally opposite the first end and extends from the first end to the second end in a length direction. The first and second ends of the base 10 respectively have a first width and a second width, which extend in a width direction perpendicular to the length direction. The second width is greater than the first width. The first end of the base 10 is curved and defines a curved peripheral edge. The second end of the base 10 is divided by a gap into two segments. The two segments have the same surface area and are of the same shape. The two segments are disposed on opposite sides of an axis A, and one segment is a mirror image of another segment. The gap extends in the length direction of the base 10 for a length. The length of the gap is less than the length of the base 10. The gap has a closed end and an open end longitudinally opposite the closed end. The open end is disposed at the second end of the base 10. The closed end is disposed between the first and second ends of the base 10. The closed end has a smaller width than the open end. The base 10 is made of cloth or leather.

The at least one first, second, third, fourth, fifth, sixth, seventh and eighth plates 21, 22, 23, 24, 25, 26, 27 and 28 are decorative elements of the multi-layer decorating element. The at least one first, second, third, fourth, fifth, sixth, seventh and eighth plates 21, 22, 23, 24, 25, 26, 27 and 28 have different shapes. The at least one first, second, third, fourth, fifth, sixth, seventh and eighth plates 21, 22, 23, 24, 25, 26, 27 and 28 have different colors. The at least one first, second, third, fourth, fifth, sixth, seventh and eighth plates 21, 22, 23, 24, 25, 26, 27 and 28 are attached on the base 10. The at least one first, second, third, fourth, fifth, sixth, seventh and eighth plates 21, 22, 23, 24, 25, 26, 27 and 28 are made of cloth, thermoplastic polyurethane (TPU), or polyurethane (PU).

The method for producing the multi-layer decorating element includes the steps of: providing a base 10 and at least one first, second, third, fourth, fifth, sixth, seventh and eighth plates 21, 22, 23, 24, 25, 26, 27 and 28 and a fixing layer, with each of the at least one first, second, third, fourth, fifth, sixth, seventh and eighth plates 21, 22, 23, 24, 25, 26, 27 and 28 including a side with a hot melt glue layer thereon; positioning the at least one first, second, third, fourth, fifth, sixth, seventh and eighth plates 21, 22, 23, 24, 25, 26, 27 and 28 on one side of the base 10 and within peripheral edges of the base 10 and positioning the fixing layer on another side of the base 10 to form a stacked array; hot pressing the stacked array; and removing the fixing layer from the hot pressed stacked array.

The at least one first plate 21 includes a first side on which the hot melt glue layer is disposed and a second side opposite the first side. The hot melt glue layer has a release liner in releasable contact therewith. Likewise, each of the at least one second, third, fourth, fifth, sixth, seventh and eighth plates 22, 23, 24, 25, 26, 27 and 28 includes a first side on which the hot melt glue layer is disposed and a distal side opposite the proximal side. Prior to positioning the at least one first, second, third, fourth, fifth, sixth, seventh and eighth plates 21, 22, 23, 24, 25, 26, 27 and 28 on the base 10, the release liners associated therewith are detached.

The at least one first plate 21 includes one first plate 21. The at least one second plate 22 includes one second plate 22. The at least one third plate 23 includes one third plate 23. The at least one fourth plate 24 includes two fourth plates 24. The at least one fifth plate 25 includes two fifth plates 25. The at least one sixth plate 26 includes two sixth plates 26. The at least one seventh plate 27 includes two seventh plates 27. The at least one eighth plate 28 includes two eighth plates 28. The first, second and third plates 21, 22 and 23 are symmetrical about the axis A and disposed in an area between the first end of the base 10 and the closed end of the gap. The first plate 21 includes a bottom side partially attached on the base 10 and partially attached on top sides of the second plate 22 and the two fourth plates 24. The first plate 21 includes a top side uncovered and representing a decorative surface. The first plate 21 has a curved peripheral edge conforming to the curved peripheral edge of the base 10. The second plate 22 includes a bottom side attached on the base 10. The top side of the second plate 22 that is uncovered by the first plate 21 represents a decorative surface. The third plate 23 includes a bottom side attached on the base 10. The third plate 23 includes a top side partially covered by two seventh plates 27 and partially uncovered. The top side of the third plate 23 that is uncovered represents a decorative surface.

The two fourth plates 24 are disposed on opposite sides of the axis A, and one fourth plate 24 is a mirror image of another fourth plate 24. One of the two fourth plates 24 is disposed on one of the two segments of the base 10. Another of the two fourth plates 24 is disposed on another of the two segments of the base 10. Each fourth plate 24 includes a bottom side partially attached on the base 10 and partially attached on a top side of one of the two fifth plates 25. Each fourth plate 24 includes a top side partially covered by the first plate 21 and one of the two seventh plates 27 and partially uncovered. The top side of each fourth plate 24 that is uncovered represents a decorative surface.

The two fifth plates 25 are disposed on opposite sides of the axis A, and one fifth plate 25 is a mirror image of another fifth plate 25. One of the two fifth plates 25 is disposed on one of the two segments of the base 10. Another of the two fifth plates 25 is disposed on another of the two segments of the base 10. Each fifth plate 25 includes a bottom side attached on the base 10. Each fifth plate 25 includes a top side partially covered by one of the two fourth plates 24 and one of the two sixth plates 26 and partially uncovered. The top side of the each fifth plate 25 that is uncovered represents a decorative surface.

The two sixth plates 26 are disposed on opposite sides of the axis A, and one sixth plate 26 is a mirror image of another sixth plate 26. One of the two sixth plates 26 is disposed on one of the two segments of the base 10. Another of the two sixth plates 26 is disposed on another of the two segments of the base 10. Each sixth plate 26 includes a bottom side partially attached on the base 10 and partially attached on a top side of one of the two seventh plates 27. Each sixth plate 26 includes a top side uncovered and representing a decorative surface.

The two seventh plates 27 are disposed on opposite sides of the axis A, and one seventh plate 27 is a mirror image of another seventh plate 27. One of the two seventh plates 27 is disposed on one of the two segments of the base 10. Another of the two seventh plates 27 is disposed on another of the two segments of the base 10. Each seventh plate 27 includes a bottom side attached on the base 10 and partially attached on the top side of the third plate 23 and the top side of one of the two fourth plates 24. Each seventh plate 27 includes a top side partially covered by one of the two sixth plates 26 and one of the two eighth plates 28 and partially uncovered. The top side of the each seventh plate 27 that is uncovered represents a decorative surface.

The two eighth plates 28 are disposed on opposite sides of the axis A, and one eighth plate 28 is a mirror image of another eighth plate 28. One of the two eighth plates 28 is disposed on one of the two segments of the base 10. Another of the two eighth plates 28 is disposed on another of the two segments of the base 10. Each eighth plate 28 includes a bottom side attached on the base 10 and partially attached on the top side of one of the two seventh plates 27. Each eighth plate 28 includes a top side uncovered and representing a decorative surface.

With the hot melt glue layers, the first, second, third, fourth, fifth, sixth, seventh and eighth plates 21, 22, 23, 24, 25, 26, 27 and 28 are prevented from moving with respect to the base 10.

The first, second, third, fourth, fifth, sixth, seventh and eighth plates 21, 22, 23, 24, 25, 26, 27 and 28 are connected to the base 10 by hot pressing rather than by stitching, thereby allowing the multilayer decorating element to be processed accurately, conveniently and in a cost-saving manner.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. A multi-layer decorating element comprising:
   a base having a length between the first and second ends thereof and first and second widths at the first and second ends respectively, with the second width being greater than the first width, with the first end of the base being curved and defining a curved peripheral edge, with the second end of the base divided by a gap into two segments, with the two segments disposed on opposite sides of an axis A with one segment being a mirror image of another segment, with the gap extending in the length direction and having a length less than the length of the base, with the gap having a closed end and an open end opposite the closed end, with the open end disposed at the second end of the base, with the closed end disposed between the first and second ends of the base, and with the closed end having a smaller width than the open end; and a plurality of plates forming decorative elements, wherein the plurality of plates includes a side comprising a hot melt glue layer and hot pressed on a side of the base, wherein the plurality of plates is disposed within peripheral edges of the base and includes a plurality of overlapped sections, and wherein the plurality of plates has different shapes;

wherein the plurality of plates includes a first plate, a second plate, and a third plate being symmetrical about the axis A, wherein the first plate, the second plate, and the third plate are disposed in an area between the first end of the base and the closed end of the gap, wherein the first plate has a curved peripheral edge conforming to the curved peripheral edge of the base, wherein the first plate includes a bottom side extending to and partially attached to the base, wherein the first plate includes a top side uncovered and representing a decorative surface; wherein the second plate includes a bottom side extending to and attached to the base, wherein the second plate includes a top side partially covered by the first plate and partially uncovered, wherein the part of the top side of the second plate that is uncovered by the first plate represents a decorative surface, wherein the third plate includes a bottom side extending to and attached to the base, and wherein the third plate includes a top side partially uncovered and representing a decorative surface;

wherein the plurality of plates includes two fourth plates, wherein the two fourth plates are disposed on opposite sides of the axis A and one fourth plate is a mirror image of another fourth plate, wherein each fourth plate includes a bottom side extending to and partially attached to the base, wherein each fourth plate includes a top side partially covered by the first plate and partially uncovered, wherein the part of the top side of each fourth plate that is uncovered represents a decorative surface, and wherein the bottom side of the first plate is partially attached to the top sides of the two fourth plates;

wherein the plurality of plates includes two fifth plates, wherein the two fifth plates are disposed on opposite sides of the axis A with one fifth plate being a mirror image of another fifth plate, wherein each fifth plate includes a bottom side extending to and attached to the base, wherein each fifth plate includes a top side partially covered by one of the two fourth plates and partially uncovered, wherein the part of the top side of the each fifth plate that is uncovered represents a decorative surface, and wherein the bottom side of each fourth plate is partially attached to the top side of one of the two fifth plates;

wherein the plurality of plates includes two sixth plates, wherein the two sixth plates are disposed on opposite sides of the axis A with one sixth plate being a mirror image of another sixth plate, wherein each sixth plate includes a bottom side extending to and partially attached to the base, wherein each sixth plate includes a top side uncovered and representing a decorative surface, and wherein the top side of each fifth plate is partially covered by one of the two sixth plates;

wherein the plurality of plates includes two seventh plates, wherein the two seventh plates are disposed on opposite sides of the axis A with one seventh plate being a mirror image of another seventh plate, wherein each seventh plate includes a bottom side extending to and attached to the base and partially attached to the top side of the third plate and the top side of one of the two fourth plates, wherein each seventh plate includes a top side partially covered by one of the two sixth plates and partially uncovered, wherein the part of the top side of the each seventh plate that is uncovered represents a decorative surface, wherein the top side of the third plate is partially covered by the two seventh plates, wherein the top side of each fourth plate is partially covered by one of the two seventh plates, and wherein the bottom side of each sixth plate is partially attached to the top side of one of the two seventh plates; and wherein the plurality of plates includes two eighth plates, wherein the two eighth plates are disposed on opposite sides of the axis A with one eighth plate being a mirror image of another eighth plate, wherein each eighth plate includes a bottom side extending to and attached to the base and partially attached to the top side of one of the two seventh plates, wherein each eighth plate includes a top side uncovered and representing a decorative surface, and wherein the top side of each seventh plate is partially covered by one of the two eighth plates.

2. The multi-layer decorating element as claimed in claim 1, wherein the plurality of plates has different colors.

3. The multi-layer decorating element as claimed in claim 1, wherein the base is made of cloth.

4. The multi-layer decorating element as claimed in claim 1, wherein the base is made of leather.

5. The multi-layer decorating element as claimed in claim 1, wherein the plurality of plates is made of cloth.

6. The multi-layer decorating element as claimed in claim 1, wherein the plurality of plates is made of thermoplastic polyurethane.

7. The multi-layer decorating element as claimed in claim 1, wherein the plurality of plates is made of polyurethane.

* * * * *